(No Model.)
J. A. O'BRIEN.
WATER CLOSET AND TRAP.
No. 304,353. Patented Sept. 2, 1884.
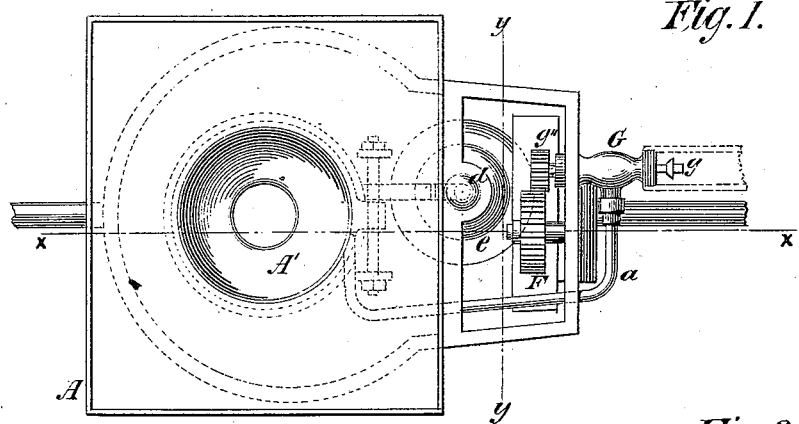
Fig. 1.
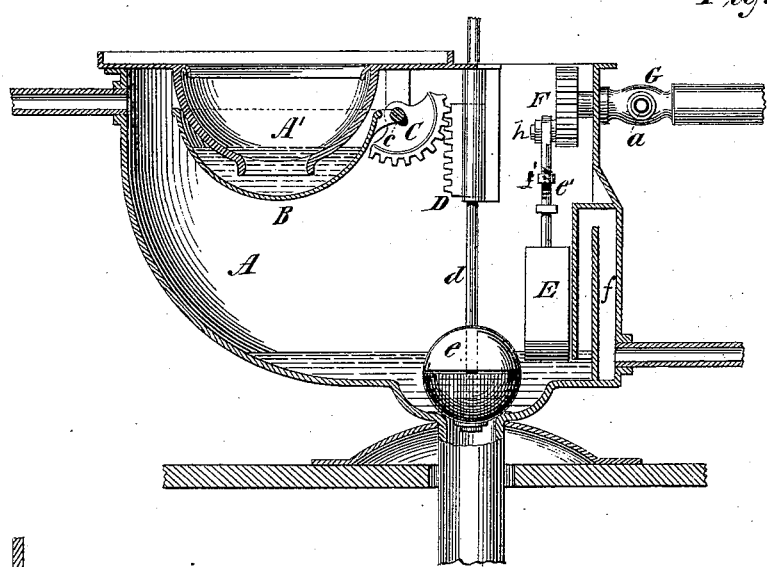
Fig. 2.
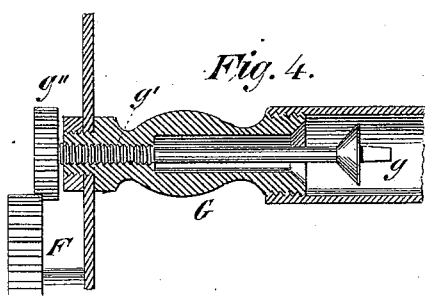
Fig. 4.
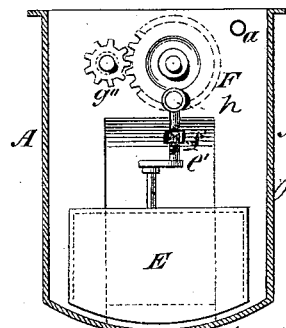
Fig. 3.
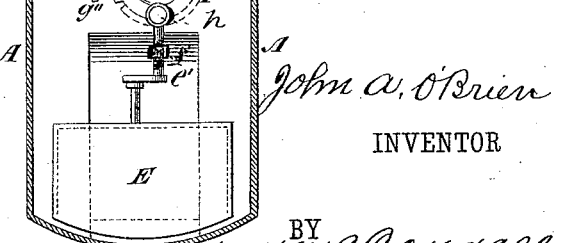
WITNESSES:
Gustave Dieterich
H. J. M. Hanahan
John A. O'Brien
INVENTOR
BY W. H. McDougall
ATTORNEY

UNITED STATES PATENT OFFICE.

JOHN A. O'BRIEN, OF NEW YORK, N. Y.

WATER-CLOSET AND TRAP.

SPECIFICATION forming part of Letters Patent No. 304,353, dated September 2, 1884.

Application filed February 19, 1884. (No model.)

*To all whom it may concern:*

Be it known that I, JOHN A. O'BRIEN, of the city, county, and State of New York, have invented a certain new and useful Improvement in Water-Closets and Traps, of which the following is a full, clear, and exact description, reference being had to the accompanying drawings, forming a part thereof.

The object of my invention is to so construct and arrange a perfect sewer-trap that it may be operated in combination with the plunger used for discharging the basin-pan and with the valve for admitting fresh water to the water-closet basin, and also to provide better facilities for keeping the water-closet and trap perfectly clean and in good order.

In the drawings, Figure 1 is a plan view of my improved water-closet. Fig. 2 is a sectional view thereof at the line $x\,x$ on Fig. 1. Fig. 3 is a transverse section at the line $y\,y$ drawn on Fig. 1. Fig. 4 is a sectional view of the valve and wheels for operating the same, and which is connected with the supply-pipe.

In putting my invention into practical use I have adopted many devices that are in common use in water-closets of this kind. The basin A' is so constructed and arranged that it rests on a lip under the seat. The receptacle or basin-pan B is operated by means of the rack D and pinion C. The rack is secured to the rod or plunger $d$, and when the rod or plunger is drawn up the valve $e$ is opened and the pan B is emptied simultaneously by means of the rack and pinion, as above stated, and thus the contents of the basin A' and the trap A are discharged into the waste-pipe at valve $e$. The plunger $d$ being let down again, the valve $e$ is closed, the pan B is raised to its place again, and the fresh water is then admitted at the valve $g$, and passes through the supply-pipes G and $a$ into the basin A'; and when the pan B is filled with water it overflows and passes into the trap A, and continues to flow till there is enough water in the trap to lift the float E, and as the float is lifted it turns the gear-wheel $g''$, which, with the screw $g'$, draws the valve $g$ tightly into its place and shuts off the water from the basin A'.

One of the principal advantages secured by this invention is that the cumbrous weights generally used for operating the basin-pan B are dispensed with and a trap which completely prevents the escape of sewer-gas is obtained; and this trap is operated in conjunction with the means used for operating the basin-pan and the fresh-water valve. The upper part of the valve $e$ is composed of lead and the lower part of rubber, which makes the valve heavy and flexible at the same time. When the piston or plunger $d$ is drawn upward, the valve $e$ is opened, the basin-pan B is emptied, and the float E being permitted to descend, as the water in the trap A escapes, the valve $g$ is opened and admits fresh water into the pan and trap. The water, as stated, will continue to flow till there is water enough in the trap to lift the float and close the valve.

The float E may be adjusted at any desirable height in the trap A, as the rod $e'$, which connects the float with the other wheel, F, by a crank-pin, $h$, on the wheel, may be made longer or shorter, without altering its mode of operation or the result produced in any way, by means of a nut, $f'$, screwing upon right and left screw-threaded adjacent ends of two parts of the said rod, or by other suitable means.

The trap A is provided with an overflow-pipe, $f$, so that when the water rises to a given height in the trap it is carried off through this overflow-pipe.

I claim as my invention—

1. In a water-closet, the combination of the plunger $d$, valve $e$ on the plunger, rack D, secured to the plunger, pinion C, geared to the rack, and basin-pan B, attached to the pinion, substantially as herein described, whereby the basin-pan is tilted and the valve opened simultaneously by lifting the said plunger.

2. In a water-closet, the combination of the supply-pipes G and $a$, screw-stemmed valve $g$, gear-wheel $g''$ on the valve-stem, wheel F, gearing into the gear-wheel $g''$, and float E in the trap A, and suspended by a crank-pin, $h$, on the gear-wheel F, substantially as and for the purpose herein specified.

JOHN A. O'BRIEN.

Witnesses:
W. H. McDOUGALL,
HENRY McGRATH.